United States Patent
Orlik et al.

(10) Patent No.: US 9,191,047 B2
(45) Date of Patent: Nov. 17, 2015

(54) DETECTING NARROW BAND INTERFERENCE IN WIRELESS NETWORKS USING SPECTRAL ANALYSIS

(71) Applicant: Mitsubishi Electric Research Laboratories, Inc., Cambridge, MA (US)

(72) Inventors: Philip Orlik, Cambridge, MA (US); Zhiyuan Weng, Stony Brook, NY (US); Kyeongjin Kim, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 124 days.

(21) Appl. No.: 14/155,525

(22) Filed: Jan. 15, 2014

(65) Prior Publication Data

US 2015/0200694 A1 Jul. 16, 2015

(51) Int. Cl.
  *H04B 17/00* (2015.01)
  *H04B 1/10* (2006.01)

(52) U.S. Cl.
  CPC .................... *H04B 1/1027* (2013.01)

(58) Field of Classification Search
  CPC ..................................................... H04B 1/0475
  USPC ................ 455/63.1, 67.11, 67.13, 114.2
  See application file for complete search history.

(56) References Cited

U.S. PATENT DOCUMENTS

| | | | |
|---|---|---|---|
| 6,711,380 B1 | 3/2004 | Callaway et al. | |
| 7,643,811 B2 | 1/2010 | Reunamaki et al. | |
| 7,848,741 B2 | 12/2010 | Kivekas et al. | |
| 7,929,508 B1 | 4/2011 | Yucek | |
| 2004/0190560 A1* | 9/2004 | Maltsev et al. | 370/503 |
| 2006/0089103 A1 | 4/2006 | Osburn et al. | |
| 2008/0043649 A1* | 2/2008 | Bhukania et al. | 370/310 |
| 2008/0267275 A1 | 10/2008 | Li et al. | |
| 2013/0258859 A1* | 10/2013 | Huang et al. | 370/241 |

OTHER PUBLICATIONS

Rayanchu et al., "Airshark: detecting non-WiFi RF devices using commodity WiFi hardware." Proceedings of the 2011 ACM SIGCOMM conference on Internet measurement conference. ACM, 2011.

Rayanchu et al. "Airshark: Detecting non-WiFi RF Devices using Commodity WiFi Hardware." IMC'11 Proceedings of the 2011 ACM Sigcomm Conference on Internet Measurement Conference, Nov. 11, 2011. pp. 137-154.

* cited by examiner

*Primary Examiner* — Ping Hsieh
*Assistant Examiner* — Xin Jia
(74) *Attorney, Agent, or Firm* — Dirk Brinkman; Gene Vinokur

(57) ABSTRACT

A method detects narrow band interference in wireless networks by first thresholding each block of samples to produce thresholded samples. The samples are normalized frequency magnitudes obtained from a spectrum of a wireless signal in a channel. Each block of the thresholded samples is summed to produce a thresholded value for each block. Then, thresholded values are autocorrelated to determine whether a bandwidth of the wireless signal is consistent with narrow band interference.

8 Claims, 4 Drawing Sheets

DETECTING NARROW BAND INTERFERENCE IN WIRELESS NETWORKS USING SPECTRAL ANALYSIS

FIELD OF THE INVENTION

The invention relates generally to detecting interference in wireless communication networks, and more particularly to detecting narrow band interference.

BACKGROUND OF THE INVENTION

In wireless local area networks (WLANs), it is necessary to detect spectrum occupancies and spatial directions of radio transmitters. This is particularly important because WLANs typically use an unregulated band, e.g., 2.4 G Hz, where many devices can operate concurrently.

For example, many devices, such as cordless telephones, car alarms, baby monitors, video senders, wireless speakers, cameras, game controllers (Xbox and Wii), and ZigBee, wireless fidelity (WiFi) and Bluetooth devices use the 2.4 GHz frequency, the same frequency at which devices designed according to the Wi-Fi standards 802.11a, 802.11g and 802.11n operate, collective known as AGN. This can cause a significant decrease in speed, or sometimes the total blocking of the Wi-Fi signal the interference is present.

It is well known that microwave ovens (MWOs) emit radio frequencies in this band that interfere with the normal operation. A WLAN device (access point or client terminal) has the ability to detect and avoid interference from other WLAN devices, primarily, though the operation of the Multiple Access Control, (MAC), protocol. However, in the case of non-WLAN devices, such as MWOs, there is no method to coordinate the use of the unregulated wireless spectrum. Thus, interference from non-WLAN devices, such as MWOs degrades performance.

Without the ability to coordinate spectrum use across systems (WLAN and non-WLAN), some methods adapt the WLAN system to the presence of interference. For example, changing the operating channel of the WLAN in response to the detection of interfering signals on a current operating channel, or modifying the data rate or coding scheme accordingly. In any event, it is necessary for WLAN devices to be able to detect the presence of interfering signals, and respond accordingly.

It is preferred that the detection of the interference is performed using existing, commercial WLAN hardware to minimize cost. Fortunately, some WLAN hardware does provide access to some signal physical layer data that can be used for interference detection.

For example, the Qualcomm Atheros 9280 AGN, WLAN chipset provides access to raw fast Fourier transform (HT) data of the received signal. Specifically, the chip can provide the magnitude of the received signal in each FFT bin that is normally used for data demodulation. Thus, the device provides a coarse estimate of the frequency spectrum of the received signal.

One system called Airshark uses the Atheros WLAN hardware to perform passive detection of various non-WiFi devices, Rayanchu et al., "Airshark: detecting non-WiFi RF devices using commodity WiFi hardware." Proceedings of the 2011 ACM SIGCOMM conference on Internet measurement conference. ACM, 2011. However, this system requires nearly continuous scanning of the channel by the hardware for detection purposes. Therefore, that system cannot be used as a conventional normal WLAN device that transmits user data.

SUMMARY OF THE INVENTION

The embodiments of the invention provide a method or detecting narrow hand interference in wireless communication networks, such as WiFi and WLANs. Specifically, it is desired to use the functionality of commercially available WiFi and WLAN devices to enable the detection of microwave oven interference.

The detection process infrequently scans the wireless channels so that normal user communications are not affected. The sampled data are processed so that only a single value is stored in the memory to represent a bandwidth of a signal that is present in a channel while scanning. Thus, the interference detection process uses a minimal amount of memory for storing data characterizing the interfering signals, such as FFT magnitude data.

Further processing of the values can generate an estimate of a duty cycle of the interfering signals to classify the signals as originating from a narrow band interferer, such as a microwave oven or other similar interferers with a known ON/OFF periodicity, when the estimated duty cycle falls within expected ranges.

As an advantage, the method uses data readily available from commercial wireless hardware that has the ability to provide coarse signal spectrum measurements. By coarse, we mean, that the fidelity of the spectrum measurements is limited in both the number of frequencies at which the spectrum is measured and also that the measurements are taken infrequently.

DETAILED DESCRIPTION OF THE PREFERRED EMBODIMENTS

The embodiments of our invention provide a method for detecting narrow band interference emitted by unregulated device. e.g., MWO, in a WLAN.

Channel Spectrogram

Figure 1:
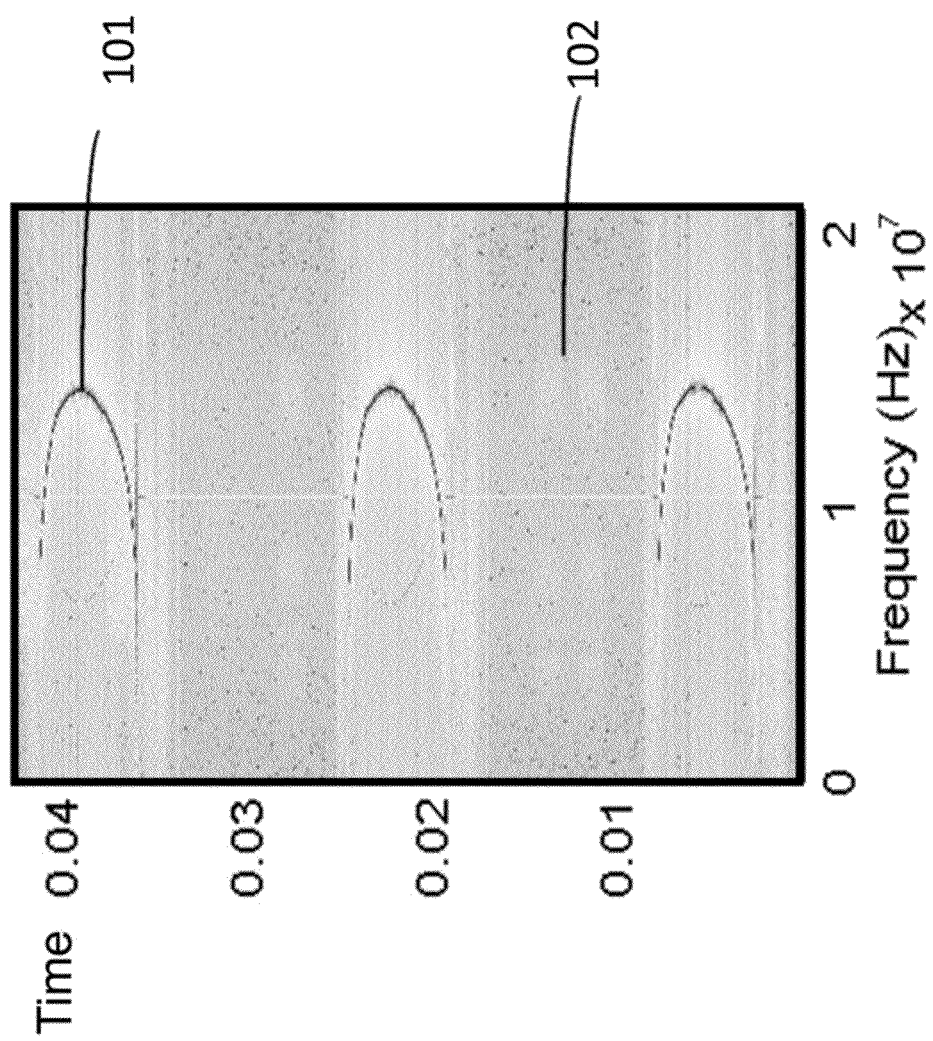
FIG. 1 is graph of a microwave oven interference signal as a function of time and frequency.

FIG. 1 is a spectrogram of radio frequency (RF) signals in a wireless channel obtained by scanning the channel. The spectrogram shows magnitudes of the frequency spectrum of the channel acquired over time (in milliseconds). The spectrogram shows signals 101 generated by the MWO, and some weaker WiFi signals 102. The MWO signals 101 span frequencies and interfere to disrupt normal operation of the WLAN devices.

The interference can vary depending on a number of factors, such as device specifics, environment, e.g., location within a building, and the like. However, we reliably detect bandwidth and periodicity of the interference to identify the source.

FIG. 1 shows that the bandwidth is relatively narrow and occupies only a few hundred kilo Hz. This figure also shows that the emissions are discontinuous with active and inactive periods of about 8 ms when the MWO is connected to alternating current (AC). The AC only generates microwaves during half, either the positive or negative portion, of the AC power period. For example, if the frequency of the AC power grid is nominally 60 Hz, the ON/OFF period is 1/60 Hz, or 16.6 ms.

Using this observation about the narrow band nature and periodicity of the MWO interference, we can detect the interference using only limited spectral reporting capabilities of commercial WLAN devices.

We assume that the WLAN device provides spectral samples, i.e., information about the signal power received in each of the sub-carriers of an 802.11 OFDM based system. For example, the widely used Qualcomm Atheros AR9280 AGN wireless card can provide information on 56 OFDM subcarriers. In each 20 MHz channel, the sub-carriers are spaced 312.5 KHz apart and data carrying signals are transmitted on 56 of these sub-carriers. The other 8 subcarriers are unused and serve as guard bands. Each spectral sample (FFT) generated by the wireless card includes the power received in 56 sub-carriers (FFT bins), which corresponds to a 17.5 MHz (56*0.3125 MHz) portion of spectrum.

Signal Processing

Figure 2:
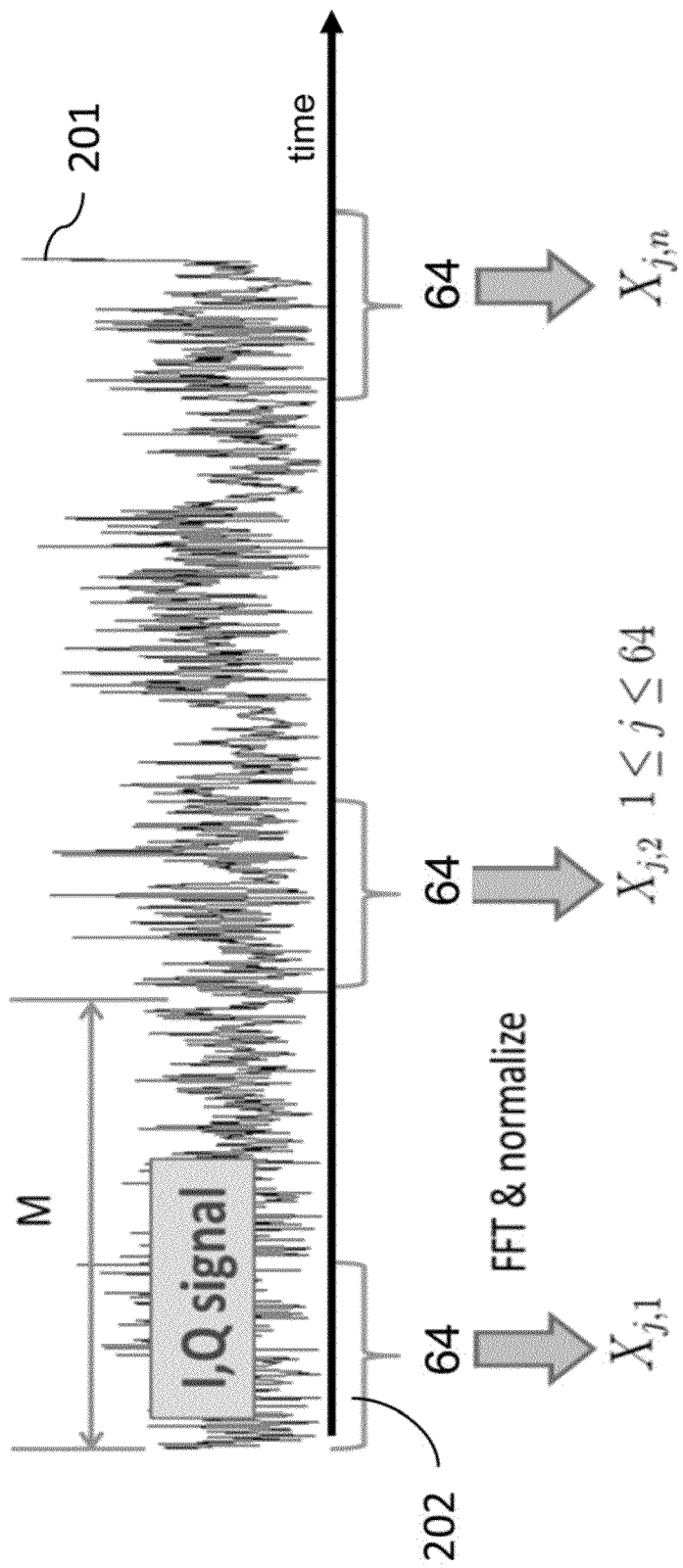
FIG. 2 is schematic of extracting data from signal samples according to embodiments of the invention.

As shown in FIG. 2, our method detects narrow band interference with a predetermined periodicity. FIG. 2 shows a received signal 201 that is sampled for further processing. The signal 201 depicts the samples of either the real or imaginary (in-phase or quadrature components (I,Q signal)) of a complex baseband signal. We assume that for every M samples of the received signal, a block $X_{j,n}$ 202 of sixty-four samples, (j=1, 2, ... 64) 202 is selected for further processing. In other words, M indicates a frequency of extracting the block of samples or equivalently the period of time between successive interference scans. As can be seen, the signal is sampled relatively infrequently, and therefore does not unduly impact the normal operation of the device. That is, WLAN device can normally be used to transmit and receive data, and only infrequently it may be used to scan the channel for interference.

Detection Method

Figure 3:
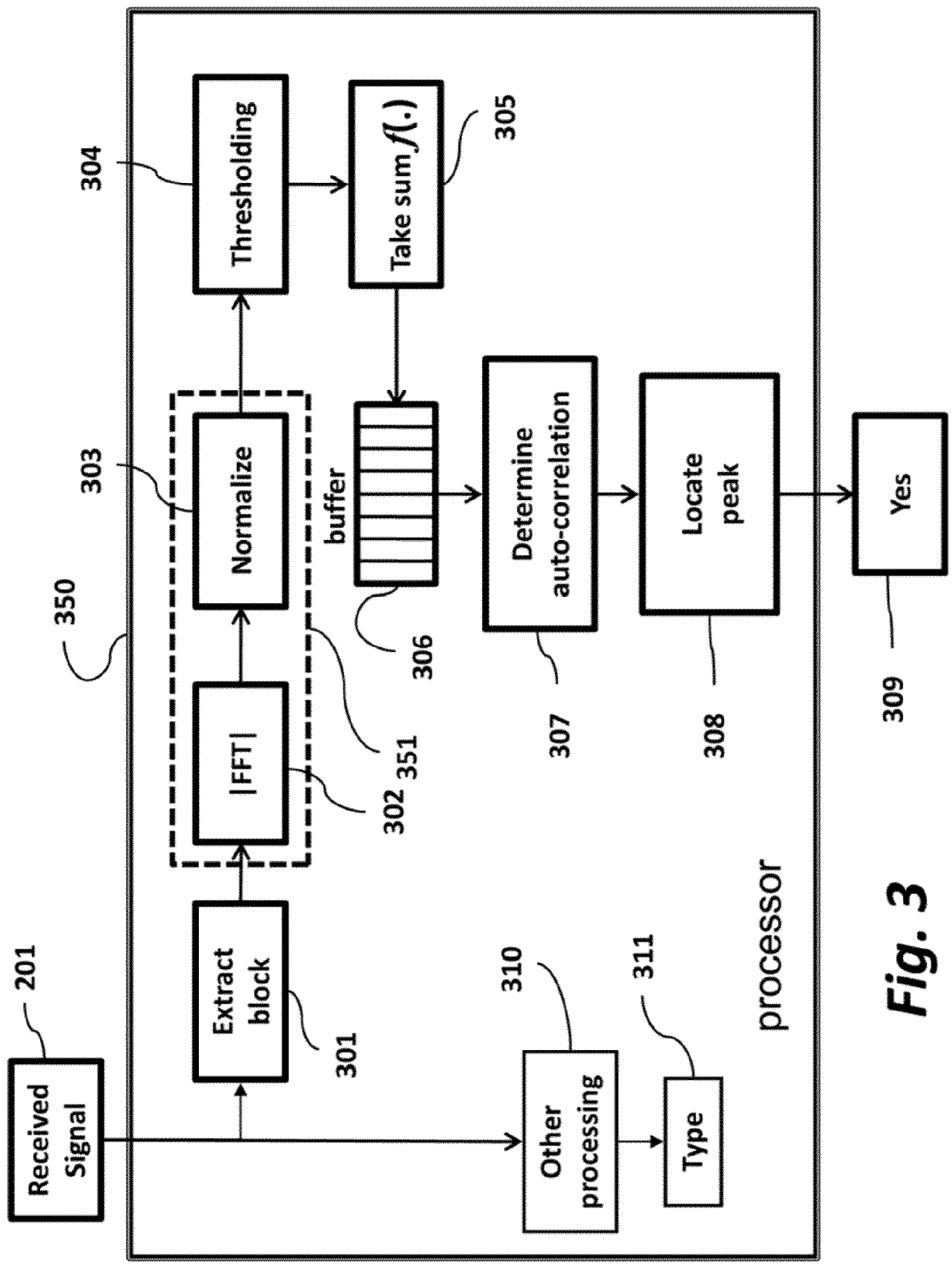
FIG. 3 is a method for detecting interference according to embodiments of the invention.

FIG. 3 shows the several steps of our interference detection method, which uses a summing function $f(.)$ to detect peaks. This method can be performed in a processor 350. The block $X_{j,n}$ 202, is extracted 301 from a received signal 201. Such blocks are typically available from commercial WLAN devices 351 as described above.

A FFT 302 is applied to the block, and magnitudes of the FFT samples are normalized 303 so that a sum of the magnitudes is 1.

The $j^{th}$ element of the $n^{th}$ vector (block) is $X_{j,n}$. We produce a single value for the $n^{th}$ block by comparing 304 the normalized FFT values $X_{j,n}$ for j=1, ..., 64, to a threshold $X_{threshold}$ 401 to produce a threshold value y(n).

Figure 4:
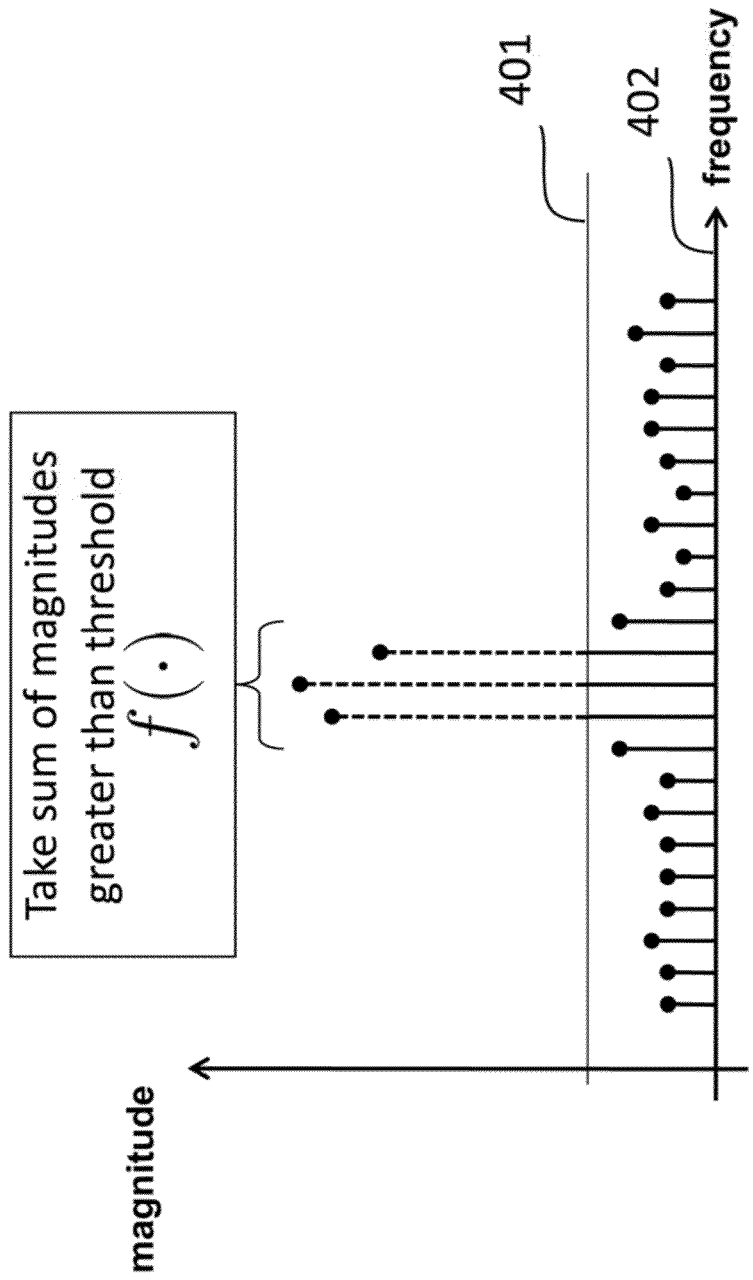
FIG. 4 is a schematic of a summing operation used by embodiments of the invention.

As shown in FIG. 4, the function $f(.)$ sums of the magnitudes larger than the threshold as $$y(n) = \sum_{j=1}^{64} (X_{j,n} - X_{threshold})_+,$$

where an operator $(x)_+$ is $$(x)_+ = \begin{cases} x & x > 0 \\ 0 & x \le 0 \end{cases}.$$

The threshold 401 can be set according to a noise floor of the WLAN device, which is also readily accessible, and also according to the bandwidth of the interfering signal. For example, for very narrow band signals, the threshold can be set to a relatively large value.

The threshold value y(n) is indicative of the bandwidth of the signal. If the bandwidth is relatively wide, then the values become smaller after normalization, such that only a small number of values are larger than the threshold.

However, if bandwidth is narrow, then the peak is much larger than the threshold after normalization, leading to a large threshold value of y(n), in other words, the FFT blocks $X_{j,n}$, are compressed to the single threshold value y(n). The values are stored in a buffer 306. The buffer is used to determine 307 an autocorrelation r(m)=E[y(n)y(n+m)] of the sequence of values y(n), where E[.] is an expectation.

We locate 308 a maximal value for r(n), i.e., a peak. Although r(n) has a maximal value at r(0), we locate a specific interval of the function r(n) where we expect an additional peak when interference is present. The interval depends on the value of M, which is selected for the periodic scanning and reporting of the frequency spectrum, the frequency of the AC power and the bandwidth of the WLAN receiver. Specifically, we expect a peak in r(n) at a location $$n = T_n = BW * \frac{1}{AC_f} * \frac{1}{M},$$

where BF is the WLAN receiver bandwidth, and $AC_f$ is the AC power frequency. Typically, for WLAN channels BW is 20 MHz. For MWO operating in North America $AC_f$ is 60 Hz. Assuming that M=640 and using the typical values for BW and $AC_f$ above, we compute $T_n$=542.53 (samples).

Thus, we expect the peak of r(n) to occur at either sample 542 or 543. After determining r(n) for n>$T_n$, we need only check 308 is the position of the peak in a region near $T_n$. If there is a peak (yes 309), the peak is consistent with narrow band interference, e.g., from a MWO, and otherwise not.

Other processing 310 can be used to determine the periodicity of interference, e.g., 1/60 Hz, or 16.6 ms for AC operated microwave ovens, and classify other types of interference signals, 311.

The method as described above can be used to detect the presence of MWO interference and relies only on spectral data that are easily obtained from commercial. WLAN hardware and requires minimal storage, i.e., only a single value for each spectral scan, and simple processing. We also note that while we have described this invention in terms of MWO interference, the method can also be used to detect any form of interference that has a narrow band and exhibits an ON/OFF periodicity.

Although the invention has been described by way of examples of preferred embodiments, it is to be understood that various other adaptations and modifications can be made within the spirit and scope of the invention. Therefore, it is the object of the appended to cover all such variations and modifications as come within the true spirit, and scope of the invention.

We claim:

1. A method for detecting narrow band interference in wireless networks, comprising:

thresholding each block of samples to produce thresholded samples, wherein the samples are normalized frequency magnitudes obtained from a spectrum of a wireless signal in a channel;

summing each block of the thresholded samples to produce a thresholded value for each block; and autocorrelating the thresholded values to determine whether a bandwidth of the wireless signal is consistent with narrow band interference, wherein the steps are performed in a processor, wherein the summing produces the thresholded value according to $$y(n) = \sum_{j=1}^{N_{fft}} (X_{j,n} - X_{threshold})_+,$$

where j indexes the a number of samples in the block n and $N_{fft}$ is a positive integer, $X_{j,n}$ are the samples, $X_{threshold}$ is the threshold, and an operator $(x)_+$ is defined by $$(x)_+ = \begin{cases} x & x > 0 \\ 0 & x \leq 0 \end{cases}.$$

wherein the autocorrelation is obtained according to
$r(m) = E[y(n)y(n+m)]$,
where $E[.]$ is an expectation and m represents a delay at which the auto correlation is evaluated.

2. The method of claim 1, wherein the spectrum is unregulated.

3. The method of claim 1, wherein the interference is emitted by a microwave oven.

4. The method of claim 1, further comprising:
determining a periodicity of interference to characterize a type of device causing the interference.

5. The method of claim 1, wherein a fast Fourier transform is applied, to the samples before the normalization.

6. The method of claim 1, wherein the processor is contained in a wireless device and the threshold is set according to a noise floor of device.

7. The method of claim 1, further comprising:
storing the thresholded values in a buffer for the autocorrelation.

8. The method of claim 1, wherein the blocks are acquired periodically.

* * * * *